A. G. Coes,
Wrench.
N° 9,945. Patented Aug. 16, 1853.
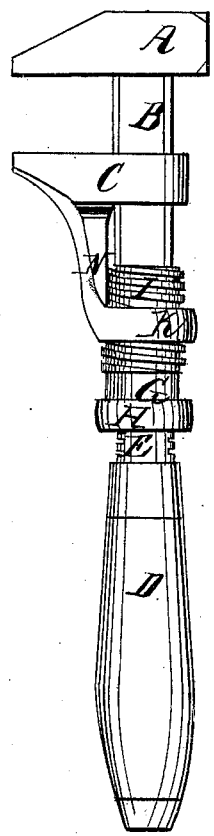
Fig: 1.
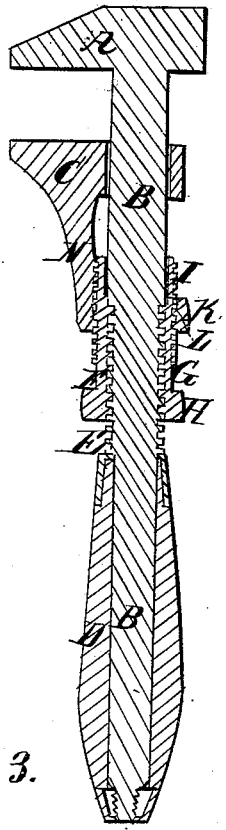
Fig: 2.
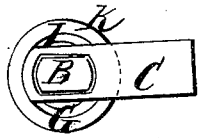
Fig: 3.

UNITED STATES PATENT OFFICE.

AURY G. COES, OF WORCESTER, MASSACHUSETTS.

SCREW-WRENCH.

Specification forming part of Letters Patent No. 9,945, dated August 16, 1853; Reissued January 3, 1860, No. 874.

*To all whom it may concern:*

Be it known that I, AURY G. COES, of Worcester, in the county of Worcester and State of Massachusetts, have invented a new and useful Improvement in Screw-Wrenches or "Coach-Wrenches," as commonly termed; and I do hereby declare that the same is fully described and represented in the following specification and the accompanying drawings, letters, figures, and references thereof.

Of the said drawings, Figure 1, denotes a side view of my improved wrench. Fig. 2, is a central and longitudinal section of it.

The hammer or stationary jaw is seen at A, as fixed permanently on the top of the shank B. The movable jaw is seen at C, it being adapted to the shank so as to be capable of sliding freely on it. The said shank B, is made with two of its opposite sides parallel to each other, while the other two are curved cylindric arcs, on which and for a short distance above the handle D, the threads of a male screw E, are cut and made to screw into a female screw F, cut within a tube G, through which the shank B, is caused to pass.

A milled head H, is placed on the lower end of the tube G, and such tube has a male screw I, formed on its outer surface, the thread of this screw being made to run in the opposite direction to that of the screw E. The said screw I, receives and screws through a female screw nut or annulus K, that has a female screw L, cut through it and adapted to the screw I. This annulus is connected with the sliding jaw C, by an arm N, as seen in the drawings; a horizontal or transverse section of the sliding jaw and the shank being given in Fig. 3.

By grasping the handle D, and rotating the tube G, in one or the other direction, the sliding jaw may be made to either advance toward or move away from the hammer jaw. This movement of the sliding jaw is faster than the longitudinal motion of the tube G, on the shank B, and is compounded of such movement of the tube G, and the longitudinal movement of the annulus K, on the screw I, or tube G. The above peculiar mode of constructing a coach wrench, not only renders it very advantageous in its uses, but renders it exceedingly durable, and little liable to break or get out of order.

I am aware, that the movable jaw of a wrench has been made to slide on a shank by means of a female screw nut placed on a screw cut on the shank, the said nut being so connected with the movable jaw as to be capable of being put in rotation and of moving the jaw on the shank.

I am also aware that the movable jaw, has been moved by means of a screw. I therefore do not claim such to be my invention, but What I do claim is—

The combination and arrangement of the screw tube (G), its male and female, or external and internal screws (I, F,), the screw E, on the shank B, the annulus K, and its female screw as applied to the sliding jaw, the whole being made to operate together substantially in manner and for the purpose of enabling a person to readily move the sliding jaw C, on the shank with a velocity compounded of the velocities of motion of two female screws on two male screws as described.

In testimony whereof, I have hereto set my signature this second day of April A. D. 1853.

AURY G. COES.

Witnesses:
 EMORY WASHBURN,
 J. B. KEYES.

[FIRST PRINTED 1913.]